United States Patent
Bae et al.

(10) Patent No.: US 8,559,094 B2
(45) Date of Patent: Oct. 15, 2013

(54) THERMOCHROMIC SMART WINDOW AND METHOD OF MANUFACTURING THE SAME

(75) Inventors: Tae-Hyun Bae, Yongin-si (KR);
Myun-Gi Shim, Yongin-si (KR);
Soo-Ho Park, Yongin-si (KR);
Dong-Gun Moon, Yongin-si (KR);
Mi-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 345 days.

(21) Appl. No.: 12/927,217

(22) Filed: Nov. 9, 2010

(65) Prior Publication Data
US 2012/0026574 A1 Feb. 2, 2012

(30) Foreign Application Priority Data
Jul. 27, 2010 (KR) .................. 10-2010-0072477

(51) Int. Cl.
*G02F 1/01* (2006.01)
*G02B 5/30* (2006.01)

(52) U.S. Cl.
USPC .. 359/288; 359/289; 359/488.01; 359/489.04

(58) Field of Classification Search
USPC .................. 359/288, 289, 488.01, 489.04
See application file for complete search history.

(56) References Cited

U.S. PATENT DOCUMENTS

| | | | |
|---|---|---|---|
| 3,873,181 A * | 3/1975 | Chivian et al. | ............... 430/1 |
| 5,801,383 A | 9/1998 | Wada et al. | |
| 2003/0054177 A1 | 3/2003 | Jin | |
| 2007/0048438 A1 | 3/2007 | Parkin et al. | |
| 2010/0129666 A1 | 5/2010 | Logunov et al. | |
| 2010/0183854 A1 | 7/2010 | Masuda et al. | |
| 2011/0085964 A1* | 4/2011 | Lukehart et al. | ......... 423/594.17 |

FOREIGN PATENT DOCUMENTS

| | | |
|---|---|---|
| JP | 10-259024 | 9/1998 |
| JP | 2000-137251 A | 5/2000 |
| JP | 2008-094642 | 4/2008 |
| JP | 2008-297177 | 12/2008 |
| KR | 10-2003-0019772 A | 3/2003 |
| WO | WO 2008/087077 A1 | 7/2008 |

OTHER PUBLICATIONS

KIPO Notice of Allowance dated Oct. 22, 2012, for Korean priority Patent application 10-2010-0072477, (5 pages).
Patent Abstracts of Japan, and English machine translation of Japanese Patent 10-259024 listed above, (12 pages), (Sep. 1998).
Machine English Translation of JP 2000-137251 A.
Ivan P. Parkin, "Thermochromic Coatings for Intelligent Architectural Glazing," *Journal of Nano Research* vol. 2 (Jan. 20, 2008) pp. 1-20.
KIPO Office action dated Mar. 26, 2012, for Korean priority Patent application 10-2010-0072477, 3 pages.
Patent Abstracts of Japan, and English machine translation for Japanese Publication 2008-297177, listed above, 43 pages.
European Search Report dated Jan. 7, 2013, for corresponding European Patent application 11250306.5, (6 pages).

* cited by examiner

*Primary Examiner* — Evelyn A. Lester
(74) *Attorney, Agent, or Firm* — Christie, Parker & Hale, LLP

(57) ABSTRACT

A thermochromic smart window and a method of manufacturing the thermochromic smart window including a glass and a thermochromic layer including a vanadium dioxide material formed on the glass. A thermochromic smart window includes a substrate and a thermochromic layer disposed on the substrate, wherein a slope of a graph of a reflectance of the thermochromic layer is at or between 1 and 2%/° C. at a threshold temperature.

17 Claims, 13 Drawing Sheets

FIG. 9

THERMOCHROMIC SMART WINDOW AND METHOD OF MANUFACTURING THE SAME

CROSS-REFERENCE TO RELATED APPLICATION

This application claims priority to and the benefit of Korean Patent Application No. 10-2010-0072477, filed on Jul. 27, 2010, the entire content of which is incorporated herein by reference.

BACKGROUND

1. Field

One or more embodiments of the present invention relate to a thermochromic smart window and a method of manufacturing the thermochromic smart window through which light transmittance varies according to a surrounding temperature.

2. Background

A smart window adjusts a transmission of a solar light. A material for adjusting the transmission of the solar light is directly applied on the smart window, and by doing so, it is possible to provide a user with the convenience of significantly reducing or increasing the transmittance of the solar light, compared to a method of attaching a film having a particular fixed transmittance to a window.

According to a type of materials indicating functions, a smart window can be classified as a liquid crystal smart window, a suspended particle display (SPD) smart window, an electrochromic (EC) smart window, a photochromic (PC) smart window, a thermochromic smart window, etc.

Figure 1:
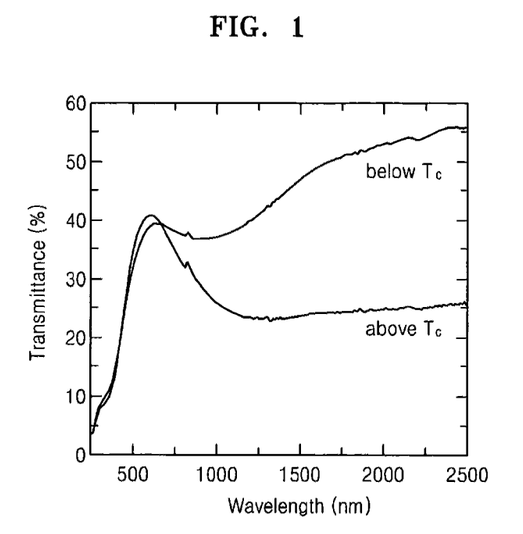
FIG. 1 is a graph of transmittance with respect to a wavelength of an incident light in a thermochromic smart window above and below a threshold temperature Tc according to one embodiment of the present invention.

From among the aforementioned materials, the transmission of the solar light through a thermochromic smart window varies according to its temperature. In particular, as illustrated in FIG. 1, the thermochromic smart window has a characteristic by which a reflectance of the thermochromic smart window is relatively high at a temperature greater than or equal to a particular temperature, and a transmission (or transmittance) of the thermochromic smart window is relatively high at a temperature less than or equal to the particular temperature, with respect to infrared rays whose wavelengths are greater than those of visible rays. Accordingly, in the winter in which an outdoor temperature is low, since the transmission (or transmittance) of the thermochromic smart window is great with respect to the infrared ray emitting (or transmitting) heat, the thermochromic smart window transmits the infrared ray so that heating costs may be saved. On the other hand, in the summer in which the outdoor temperature is high, since the transmittance of the thermochromic smart window is small with respect to infrared rays, the thermochromic smart window blocks inflow of heat so that cooling costs may be saved.

SUMMARY

Additional aspects will be set forth in part in the description which follows and, in part, will be apparent from the description, or may be learned by practice of the presented embodiments.

A thermochromic smart window and a method of manufacturing the thermochromic smart window according to one or more embodiments of the present invention may create an environment in which a human body would feel comfortable due to gentle variation of a transmittance at a threshold temperature, and may increase an energy efficiency in cooling and heating operations since a hysteresis width in a graph of a transmittance variation of a light with respect to a temperature is small.

In one embodiment of the present invention, a thermochromic smart window includes: a substrate; and a thermochromic layer on the substrate, wherein a slope in a graph of a reflectance of the thermochromic layer is at or between 1 and 2%/° C. at a threshold temperature.

In another embodiment of the present invention, a method of manufacturing a thermochromic smart window includes providing a substrate; and forming a thermochromic layer on the substrate by pulsed laser deposition (PLD), wherein a slope in a graph of a reflectance of the formed thermochromic layer is at or between 1 and 2%/° C. at a threshold temperature.

BRIEF DESCRIPTION OF THE DRAWINGS

These and/or other aspects will become apparent and more readily appreciated from the following description of embodiments of the present invention, taken in conjunction with the accompanying drawings of which.

DETAILED DESCRIPTION

Reference will now be made in detail to embodiments, examples of which are illustrated in the accompanying drawings.

Figure 2:
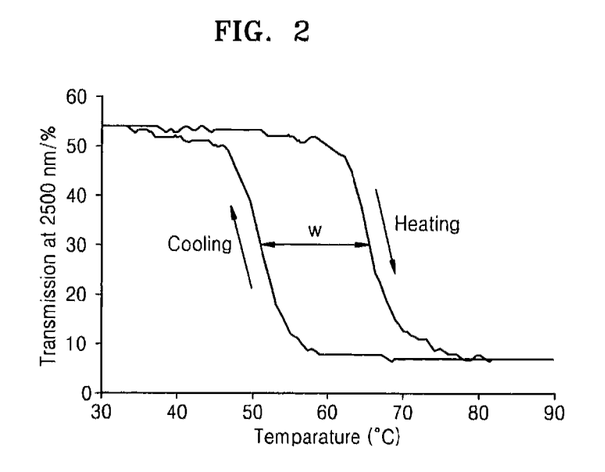
FIG. 2 is a graph of transmittance at 2500 nm with respect to a temperature in a thermochromic smart window.

A thermochromic smart window according to an embodiment of the present invention is formed in a manner that a thermochromic layer is formed on a glass. As illustrated in FIG. 2, the thermochromic smart window having the thermochromic layer exhibits a characteristic by which a transmission varies according to a temperature. The transmittance (or transmission) or a reflectance of the thermochromic smart window is rapidly changed at a threshold temperature Tc, and in this regard, when a temperature is greater than the threshold temperature Tc, a vanadium dioxide ($VO_2$) layer of the thermochromic layer is transitioned from a monoclinic state to a tetragonal state so that the reflectance increases.

For a pleasant indoor cooling environment in one embodiment of the present invention, a slope in a graph of the transmittance or the reflectance at the threshold temperature Tc is not too sharp but is gentle so that transmittance or the reflectance may gradually vary. Also, a hysteresis width W is small in the graph of the transmittance or the reflectance with respect to an increased temperature due to a heating operation and a decreased temperature due to a cooling operation. This is because energy efficiency decreases when the hysteresis width W is large. The slope in the graph of the transmittance or the reflectance at the threshold temperature Tc may be adjusted by varying a manufacturing process and a value of a process variable with respect to the thermochromic layer.

Here, in FIG. 2, the graph of the transmittance with respect to temperature is schematically illustrated for convenience of description, and does not indicate variation of the transmittance with respect to a temperature in the thermochromic smart window according to the present embodiment.

Hereinafter, a process and a process variable with respect to formation of the thermochromic layer on a glass of the thermochromic smart window according to the present embodiment will now be described with reference to FIG. 3.

The thermochromic layer is formed by Pulsed Laser Deposition (PLD). The PLD is one of Physical Vapor Deposition (PVD) techniques. The PLD is performed in a manner that a high power pulsed laser is irradiated inside a vacuum chamber to strike a target material to be deposited, and then the target material is vaporized in a plasma plume which deposits vaporized material as a thin film on a substrate that is a deposition target object.

Figure 3:
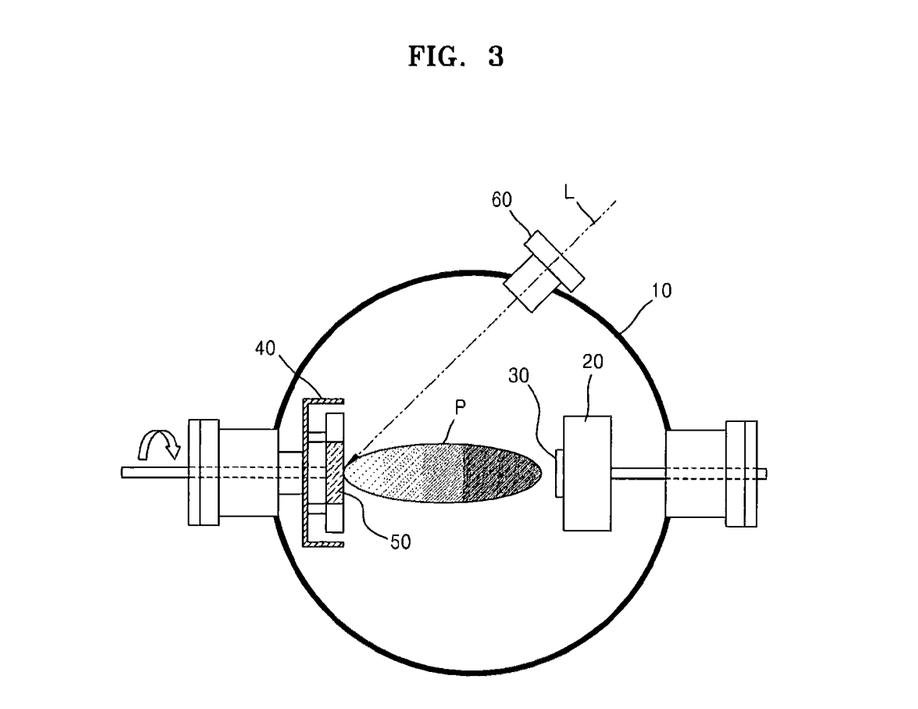
FIG. 3 is a schematic diagram of an apparatus for manufacturing a thermochromic smart window according to one embodiment of the present invention.

FIG. 3 is a schematic diagram of an apparatus (that is, a PLD apparatus) for manufacturing a thermochromic smart window according to embodiments of the present invention.

A laser is arranged in a manner that a laser beam L is incident via a quartz window port 60 arranged on a vacuum chamber 10 and then is irradiated on a target deposition material 50. The target deposition material 50 is supported by a target carousel 40 that is arranged to be rotatable in the vacuum chamber 10. A sample stage 20 is arranged in an opposite side of the target carousel 40 in the vacuum chamber 10. The sample stage 20 may be heated by including a heating member. A substrate 30 that is a target deposition object is disposed on the sample stage 20, and the substrate 30 faces the target carousel 40.

Hereinafter, process variables will now be described with respect to a process for forming a thermochromic layer on a glass 100 in the thermochromic smart window by using the PLD apparatus of FIG. 3.

In the present embodiment, the target deposition material 50 is vanadium dioxide $VO_2$.

The laser for generating the laser beam L corresponds to an excimer laser that may be a krypton fluoride (KrF) excimer laser. The KrF excimer laser uses or emits radiation of 248 nm.

Laser fluence of the laser beam L, which indicates an amount of an incident energy for a unit area, may be about 4 $J/cm^2$. That is, in the case where the laser beam L is focused in unit area (1 $cm^2$) and is incident, a level of an energy of the incident laser beam L is 4 J.

A repetition rate of the laser beam L may be 8 Hz. The laser beam L is incident after being pulsed, and the fact that the repetition rate is 8 Hz refers to a pulse of the laser beam L being generated eight times in one second.

A distance between the substrate 30, which is the target deposition object, and the target deposition material 50, which is the vanadium dioxide $VO_2$, may be about 8.5 cm.

In addition, a background gas may be oxygen $O_2$. In the present embodiment, the oxygen $O_2$ may flow into the vacuum chamber 10 at a set or predetermined pressure, e.g., at $10^{-4}$ Torr, and an oxygen partial pressure in the vacuum chamber 10 may be about 1-2 mTorr. The oxygen $O_2$ is used to deposit an oxide so as to completely oxidize the vanadium dioxide $VO_2$ that is deposited on the substrate 30.

A deposition pressure indicating a pressure in which the vaporized vanadium dioxide plume is deposited on the substrate 30 may be 10 mTorr.

The substrate 30 may be a glass including a lightweight low expansion glass (e.g., Corning® Eagle XG™ or Corning® Eagle2000™ glass). Also, the substrate 30 may be an Si substrate (e.g., a crystal Si substrate having Miller index (100) crystal plane) formed by depositing an $SiO_2$ thin film so as to have a particular thickness. Alternatively, the substrate 30 may be an r-plane sapphire substrate. The r-plane sapphire substrate refers to a sapphire substrate with a principal surface being an r-plane.

The substrate 30 may be heated to reach a temperature of about 400° C.

A deposition time may be about 12.5 min.

Table 1 exhibits the process variable and its value which are described above.

| | |
|---|---|
| Target | $VO_2$ |
| Laser type | Excimer laser, KrF (248 nm) |
| Laser fluence | 4 $J/cm^2$ |
| Repetition rate | 8 Hz |
| Target-substrate distance | 8.5 cm |
| Background gas | $O_2$ |
| Deposition pressure | 10 mTorr |
| Substrate | lightweight low expansion glass, Si(100)/$SiO_2$, r-plane |
| Substrate temperature | 400° C. |
| Deposition time | 12.5 min |

Figure 4A:
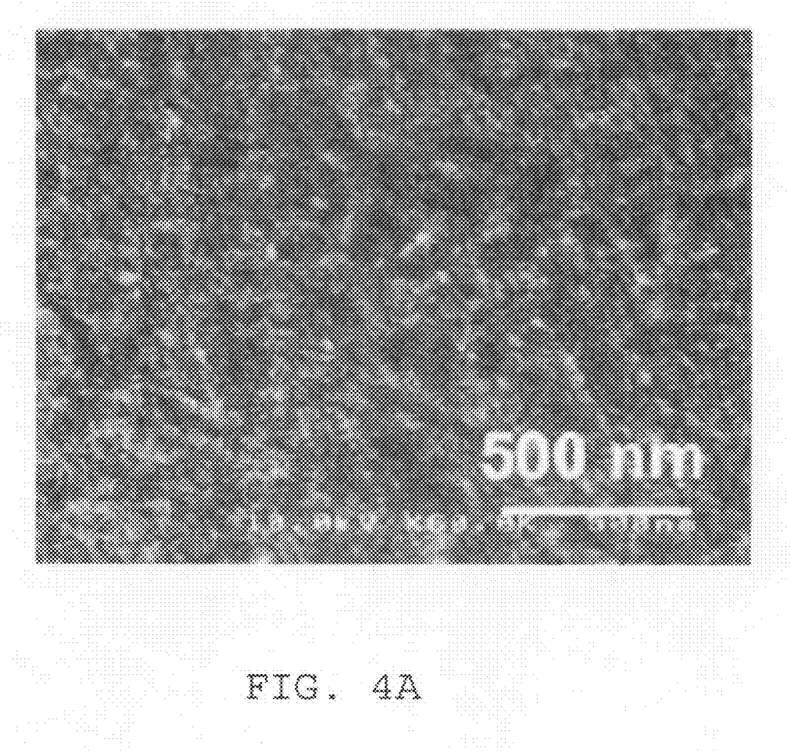
FIG. 4A is a picture of a size of particles of a vanadium dioxide layer in a thermochromic smart window according to an embodiment of the present invention, which is manufactured by using process variable values in Table 1.
Figure 4B:
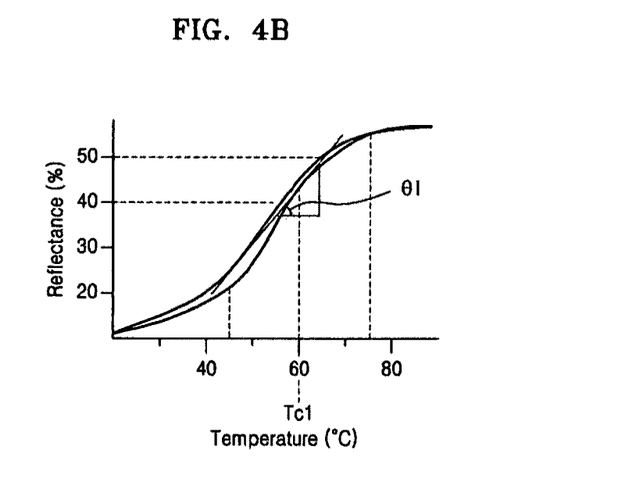
FIG. 4B is a graph of reflectance with respect to a temperature in the embodiment of FIG. 4A.

FIG. 4A is a picture of particles of the vanadium dioxide layer obtained when the thermochromic layer is formed on the substrate 30 by PLD with the value of the process variables by using the PLD apparatus of FIG. 3. FIG. 4B is a graph of reflectance variation with respect to a temperature in the thermochromic smart window when the particles of the vanadium dioxide are crystallized as illustrated in FIG. 4A.

Referring to FIG. 4A, it can be seen that an average size of the crystallized particles of the vanadium dioxide layer is less than 100 nm.

A threshold temperature in the one or more embodiments of the present invention is defined as a mid-temperature between a temperature at which a slope in a reflectance or transmittance graph with respect to a temperature is sharply increased, and a temperature at which the slope is sharply decreased. Referring to FIG. 4B, a temperature at which a slope in a reflectance graph is sharply increased is approximately or about 45° C. and a temperature at which the slope is sharply decreased is approximately or about 75° C., so that a threshold temperature Tc1 is about 60° C. Also, a slope θ1 of the reflectance graph at the threshold temperature Tc1 is approximately or about 1.3%/° C.

For an increase of an efficiency with respect to cooling and heating operations, and comfort of a human body, in one embodiment the slope in the reflectance or the transmittance graph with respect to a threshold temperature is at or between 1 and 2%/° C., so that the slope gently varies. The threshold temperature may vary according to a type of materials for forming the thermochromic layer or a method of forming the thermochromic layer, and the threshold temperature may be set at a temperature at or between 50° C. and 70° C. Thus, a slope of a reflectance graph (ΔR/ΔT) at a particular temperature at or between 50° C. and 70° C. may be at or between 1 to about 2%/° C., wherein the threshold temperature may be at or between 50 and 70° C. That is, any thermochromic layered glass with the slope of a reflectance graph (ΔR/ΔT) at a particular temperature at or between 50° C. and 70° C. being at or between 1 and 2%/° C. is encompassed by the scope of the one or more embodiments of the present invention. In one exemplary embodiment, the threshold temperature is at or between 60° C. and 70° C. In another exemplary embodiment, the range of the threshold temperature is at or between 65° C. and 70° C.

In addition, to increase the efficiency with respect to the cooling and heating operations, and for the improvement in the comfort of the human body, a hysteresis width may be less than or equal to 10° C. In one embodiment, the hysteresis width is less than or equal to 2° C.

Here, a reflectance at which the hysteresis width is determined may be set in the range of about 40 to about 50%.

In the graph of FIG. 4B, the hysteresis width at the reflectance of about 40% is about 2° C., and the hysteresis width at the reflectance of about 50% is (approximately) less than or equal to 1° C. Thus, the thermochromic smart window according to one embodiment of the present invention can provide an environment in which the efficiency with respect to the cooling and heating operations can be increased and the human body can feel comfortable.

Figure 5A:
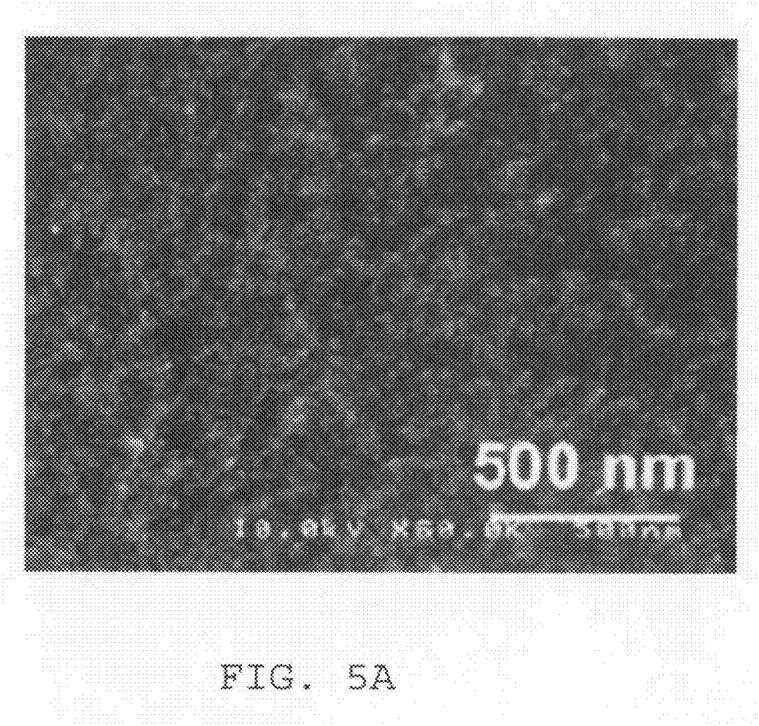
FIG. 5A is a picture of a size of particles of a vanadium dioxide layer in a thermochromic smart window according to another embodiment of the present invention, which is manufactured by using process variable values in Table 1.
Figure 5B:
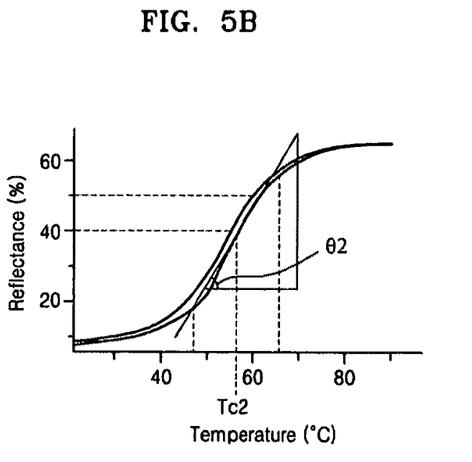
FIG. 5B is a graph of reflectance with respect to a temperature in the embodiment of FIG. 5A.

FIG. 5A is a picture of particles of a vanadium dioxide layer obtained when the thermochromic layer is deposited on the substrate 30 by PLD with the same value of the process variable in FIG. 4A by using the PLD apparatus of FIG. 3. FIG. 5B is a graph of reflectance variation with respect to a temperature in the thermochromic smart window when the particles of the vanadium dioxide are crystallized as illustrated in FIG. 5A.

Referring to FIG. 5B, a temperature at which a slope of a reflectance graph is sharply increased is approximately or at 47° C. and a temperature at which the slope is sharply decreased is approximately or at 65° C., so that a threshold temperature Tc2 is approximately or at 56° C. Also, a slope θ2 of the reflectance graph at the threshold temperature Tc2 is about 1.8%/° C. In this manner, since the slope of a transmittance graph or the reflectance graph at the threshold temperature Tc2 is within the range of about 1 to about 2%/° C., it is possible to create an environment in which an efficiency with respect to cooling and heating operations can be increased and a human body can feel comfortable.

For an increase of the efficiency with respect to the cooling and heating operations, and the comfort of the human body, a hysteresis width may be less than or equal to 10° C., in particular, the hysteresis width may be less than or equal to 2° C. Here, a reflectance at which the hysteresis width is determined may be set in the range of about 40 to about 50%.

In the graph of FIG. 5B, the hysteresis width at the reflectance of about 40 to about 50% is maintained to be less than or equal to about 1° C. Thus, the thermochromic smart window according to one embodiment of the present invention can provide an environment in which the efficiency with respect to the cooling and heating operations can be increased and the human body can feel comfortable.

Reflectances of FIGS. 4B and 5B are respectively measured based on a reflectance of a light having a wavelength of about 1000 nm. A wavelength of an infrared area that may affect cooling and heating operations in a building is in the range of about 1000 to about 2000 nm. A level of the reflectance of the light according to a temperature in a thermochromic layer may vary depending on the wavelength of the infrared area, however, the slope of the reflectance graph is relatively unchanged.

FIGS. 6A through 8A, and FIGS. 6B through 8B are variation graphs of reflectances with respect to pictures of a size of particles of a vanadium dioxide layer in the thermochromic smart window obtained by using the other process variable values than in Table 1 according to first through third comparative examples. Here, as the sizes of the particles of the vanadium dioxide layers become large (or increase), a slope of a reflectance graph in the range of a threshold temperature becomes large (or increases) or a hysteresis width becomes large (or increases). That is, the sizes of the particles of the vanadium dioxide layers are closely related to the slope of the reflectance graph and the hysteresis width.

Figure 8A:
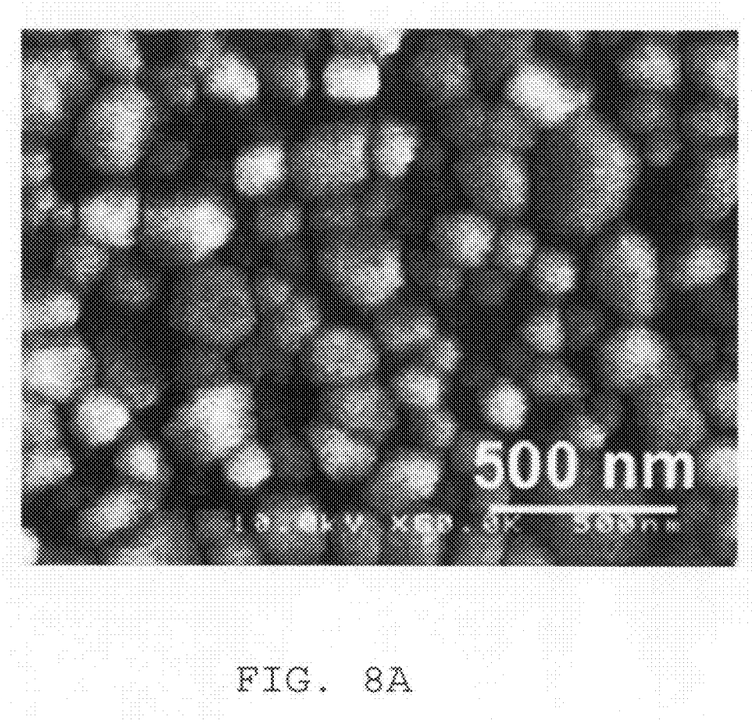
FIG. 8A is a picture of a size of particles of a vanadium dioxide layer in a thermochromic smart window according to a third comparative example.
Figure 8B:
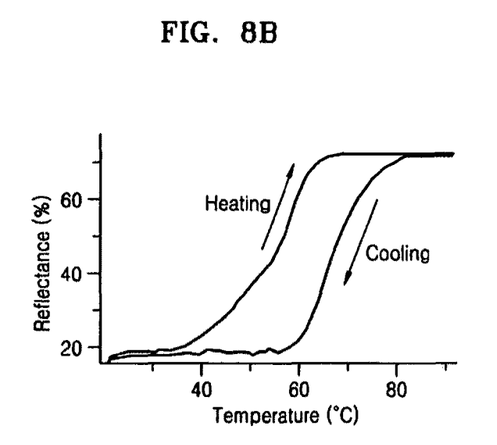
FIG. 8B is a graph of reflectance with respect to a temperature in the thermochromic smart window according to the third comparative example.

This becomes clear by comparing the examples of FIGS. 4A and 4B with the examples of FIGS. 8A and 8B.

Figure 6A:
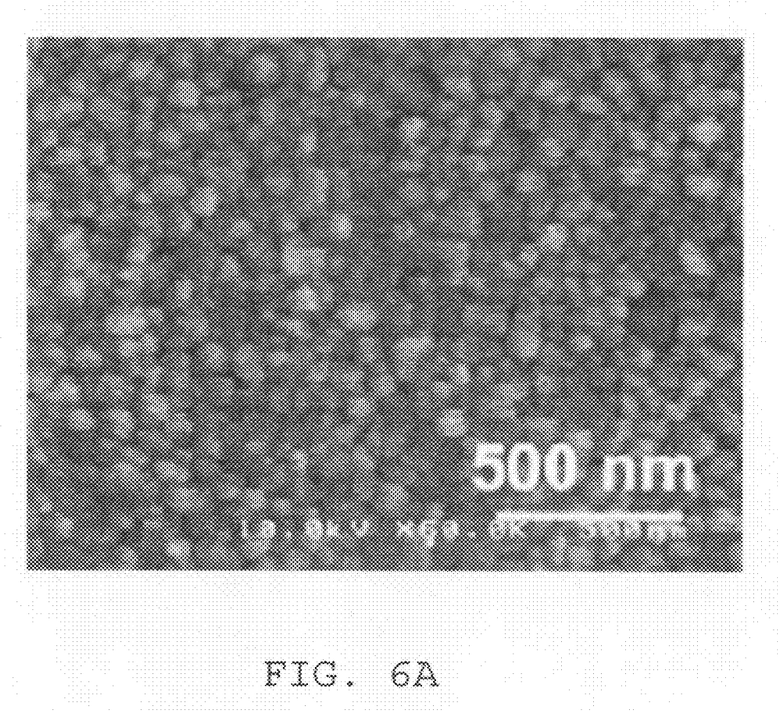
FIG. 6A is a picture of a size of particles of a vanadium dioxide layer in a thermochromic smart window according to a first comparative example.
Figure 6B:
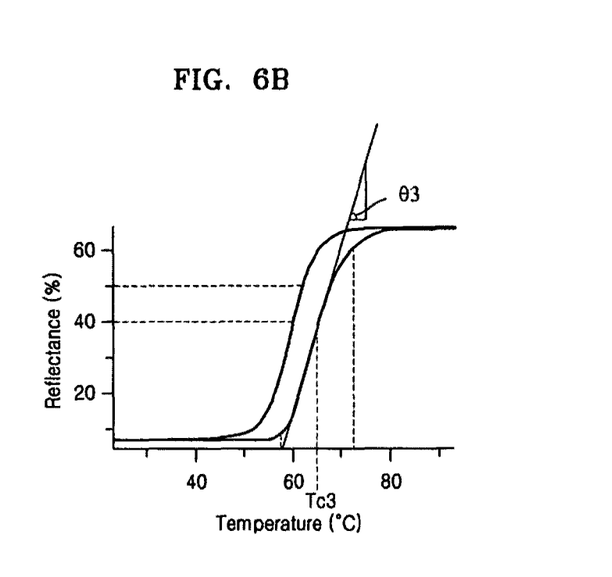
FIG. 6B is a graph of reflectance with respect to a temperature in the thermochromic smart window according to the first comparative example.

Referring to a particle picture of FIG. 6A, in a first comparative example, it can be seen that sizes of particles are large compared to those in FIG. 4A or 5A. As a result of the comparison, it can be inferred that the sizes are significantly increased since a slope at 65° C. that is an approximate threshold temperature Tc3 in a reflectance graph in a temperature decrease is about 3%/° C.

As described above, in the case where the slope in the reflectance graph is significantly changed at or around a threshold temperature, illumination due to incident light rapidly changing such that a human body may not feel comfortable. Also, a rapid change of a reflectance with respect to a solar ray deteriorates an efficiency of cooling and heating operations.

In addition, it can be seen that the hysteresis width is about 7° C. when the reflectance is about 40%, and the hysteresis width is about 8° C. when the reflectance is about 50%.

Figure 7A:
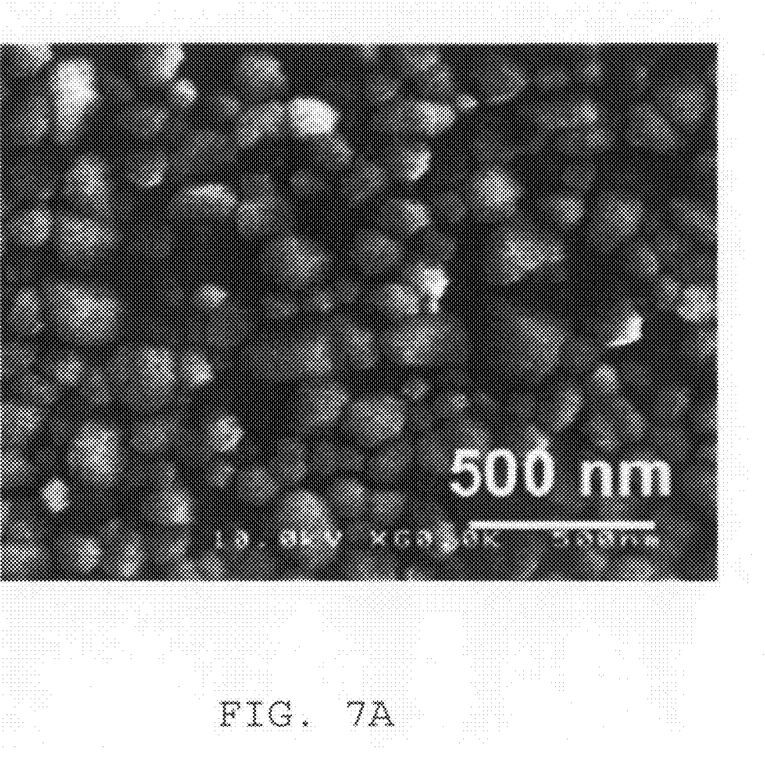
FIG. 7A is a picture of a size of particles of a vanadium dioxide layer in a thermochromic smart window according to a second comparative example.
Figure 7B:
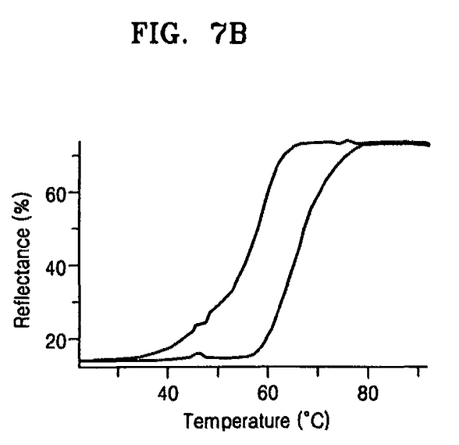
FIG. 7B is a graph of reflectance with respect to a temperature in the thermochromic smart window according to the second comparative example.

The sizes of the particles illustrated in FIGS. 7A and 8A in a second and a third comparative example, respectively, are larger than those of FIG. 6A, such that the hysteresis widths in the reflectances 40% and 50% gradually increase to be more than 10° C.

If the hysteresis width is larger than about 10° C., it is disadvantageous in terms of an energy efficiency. For example, in the case where the hysteresis width is large as in a third comparative example illustrated in FIG. 8B, when a smart window is heated to be 60° C. due to a strong sunlight in the summer, a reflectance is about 60% so that a relatively great deal of sunlight is blocked. However, when a cooling operation is started so that the smart window is cooled down to be 60° C., the reflectance is not 60% but may be about 20% such that a relatively great deal of strong sunlight may enter, and it is necessary to increase the cooling operation. Also, when the hysteresis width is too large, a difference between an amount of incident sunlight in the time of a temperature increase and an amount of incident sunlight in the time of a temperature decrease with respect to the same temperature becomes large, such that physical comfort may deteriorate.

Also, in one embodiment, the size of the particles of the vanadium dioxide layer is greater than or equal to 40 nm. This is because in one embodiment a thermochromic characteristic of the vanadium dioxide layer deteriorates when the size of the particles is less than or equal to 40 nm.

In the case of one embodiment of the present invention which is illustrated in FIGS. 4A through 5B, an average size of particles of a vanadium dioxide layer is about 50 nm.

The size of the particles of the vanadium dioxide in the deposited thermochromic layer varies according to values of several process variables in Table 1, and a slope of a reflectance graph and a hysteresis width at a threshold temperature vary according to the size of the particles, so that it is very important to appropriately adjust the values of the several process variables.

While Table 1 exhibits the values of the several process variables that are used in PLD, the scope of embodiments of the present invention is not limited thereto. That is, the values of the several process variables may be slightly adjusted provided that a slope of a reflectance graph ($\Delta R/\Delta T$) at a particular temperature in the range of about 50 to about 70° C. is within the range of about 1 to about 2%/° C., and that a hysteresis width in a reflectance in the range of about 40 to about 50% is less than or equal to 10° C.

In one embodiment, a thickness of a vanadium dioxide formed as a thermochromic layer on a glass substrate is less than or equal to 40 μm. In one exemplary embodiment, the thickness of the vanadium dioxide is from about 20 to about 40 μm. In one embodiment, if the thickness of the vanadium dioxide is greater than 40 μm, a transmission of light is visually deteriorated. On the other hand and in another embodiment, if the thickness of the vanadium dioxide is less than 20 μm such that the vanadium dioxide is too thin, a thermochromic characteristic is deteriorated.

Figure 9:
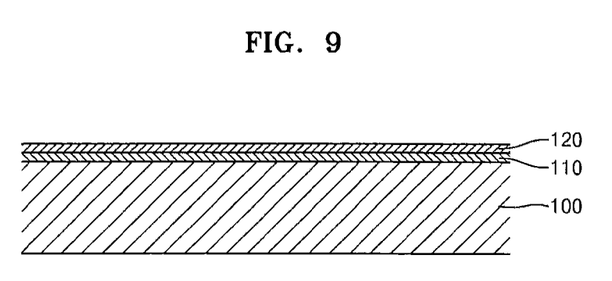
FIG. 9 is a cross-sectional view of a thermochromic smart window according to another embodiment of the present invention.

Also, as illustrated in FIG. 9, in one embodiment, a thermochromic smart window according to another embodiment of the present invention further includes a protective layer 120 on a vanadium dioxide layer 110. In another embodiment, the protective layer 120 includes a $TiO_2$ layer. The $TiO_2$ layer may be formed using various methods including a PLD method or a sputtering method.

While the present invention has been described in connection with certain exemplary embodiments, it is to be understood that the invention is not limited to the disclosed embodiments, but on the contrary is intended to cover modifications and equivalent arrangements included within the spirit and scope of the appended claims, and equivalents thereof.

What is claimed is:

1. A thermochromic smart window comprising:
a substrate; and
a thermochromic layer on the substrate,
wherein:
a slope in a graph of a reflectance of the thermochromic layer is at or between 1 and 2%/° C. at a threshold temperature, and
in the graph of the reflectance of the thermochromic layer, the reflectance is higher at a temperature above the threshold temperature than that at a temperature below the threshold temperature.

2. The thermochromic smart window of claim 1, wherein the threshold temperature is at or between 50° C. and 70° C.

3. The thermochromic smart window of claim 1, wherein the threshold temperature is at or between 60° C. and 70° C.

4. The thermochromic smart window of claim 1, wherein a hysteresis width of the graph of the reflectance is less than or equal to 10° C.

5. The thermochromic smart window of claim 1, wherein a hysteresis width of the graph of the reflectance is less than or equal to 2° C.

6. The thermochromic smart window of claim 1, wherein the reflectance is at or between 40% and 50%.

7. The thermochromic smart window of claim 1, wherein the thermochromic layer comprises a vanadium dioxide layer, and an average size of particles of the vanadium dioxide layer is from about 40 nm to about 100 nm.

8. The thermochromic smart window of claim 1, wherein the thermochromic layer comprises a vanadium dioxide layer, and a thickness of the vanadium dioxide layer is at or between 20 μm and 40 μm.

9. A method of manufacturing a thermochromic smart window, the method comprising:
providing a substrate; and
forming a thermochromic layer on the substrate by Pulsed Laser Deposition (PLD),
wherein:
a slope in a graph of a reflectance of the formed thermochromic layer is at or between 1 and 2%/° C. at a threshold temperature, and
in the graph of the reflectance of the formed thermochromic layer, the reflectance is higher at a temperature above the threshold temperature than that at a temperature below the threshold temperature.

10. The method of claim 9, wherein the threshold temperature is at or between 50° C. and 70° C.

11. The method of claim 9, wherein the threshold temperature is at or between 60° C. and 70° C.

12. The method of claim 9, wherein a hysteresis width of the graph of the reflectance is less than or equal to 10° C.

13. The method of claim 9, wherein a hysteresis width of the graph of the reflectance is less than or equal to 2° C.

14. The method of claim 9, wherein the reflectance is at or between 40% and 50%.

15. The method of claim 9, wherein the thermochromic layer comprises a vanadium dioxide layer, and an average size of particles of the vanadium dioxide layer is from 40 nm to about 100 nm.

16. The method of claim 9, wherein the thermochromic layer comprises a vanadium dioxide layer having a thickness at or between 20 μm and 40 μm.

17. A system of manufacturing a thermochromic smart window, the system comprising:
means for providing a substrate; and
means for forming a thermochromic layer on the substrate, wherein:
a slope in a graph of a reflectance of the thermochromic layer is at or between 1 and 2%/° C. at a threshold temperature, and
in the graph of the reflectance of the thermochromic layer, the reflectance is higher at a temperature above the threshold temperature than that at a temperature below the threshold temperature.

* * * * *